United States Patent [19]

Shum et al.

[11] Patent Number: 4,598,942
[45] Date of Patent: Jul. 8, 1986

[54] FORCE-CONTROLLED GRIPPER WITH ADAPTIVE ACCOMMODATION

[75] Inventors: Lanson Y. Shum, Silver Spring, Md.; Brian D. Ottinger, Penn Hills, Pa.

[73] Assignee: Westinghouse Electric Corp., Pittsburgh, Pa.

[21] Appl. No.: 633,777

[22] Filed: Jul. 23, 1984

[51] Int. Cl.⁴ .............................................. B25J 15/10
[52] U.S. Cl. ................................... 294/106; 294/86.4; 901/31; 901/38
[58] Field of Search ................ 294/67.32, 81.52, 86.4, 294/88, 93, 97, 106; 3/1.1, 12, 12.6, 12.7; 74/111, 159, 411, 660, 661; 269/224, 285; 279/110; 414/5, 6, 730; 901/31–34, 36–39, 49

[56] References Cited

U.S. PATENT DOCUMENTS

| | | | |
|---|---|---|---|
| 3,901,547 | 8/1975 | Skinner | 294/106 X |
| 4,179,783 | 12/1979 | Inoyama et al. | 901/32 X |
| 4,529,237 | 7/1985 | Gupta et al. | 294/86.4 |

FOREIGN PATENT DOCUMENTS

| | | | |
|---|---|---|---|
| 200867 | 6/1983 | German Democratic Rep. | 294/106 |
| 136257 | 11/1978 | Japan | 294/106 |
| 667396 | 6/1979 | U.S.S.R. | 294/106 |
| 673448 | 7/1979 | U.S.S.R. | 294/88 |
| 804427 | 2/1981 | U.S.S.R. | 294/106 |
| 867648 | 9/1981 | U.S.S.R. | 294/106 |

Primary Examiner—Johnny D. Cherry
Attorney, Agent, or Firm—E. C. Arenz

[57] ABSTRACT

In a gripper device including a power frame of a motor 10, shaft 12, sun gear 14, planetary gear 16, gripper assembly shaft 18, gripper lever 20, gripper finger 22, a clutch 24 is interposed in the power train to each gripper finger and is controlled to provide a low force coupling transmittal when the fingers are moved in a position to contact the object 26 to be gripped, and after all fingers have contacted the object, the clutch provides for the transmittal of a relatively higher force adequate to permit handling the object without slipping.

8 Claims, 7 Drawing Figures

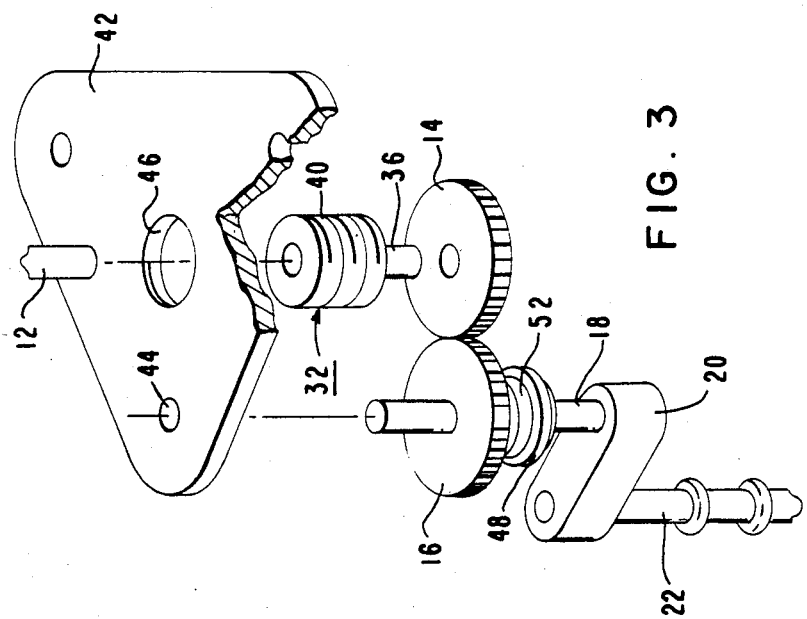
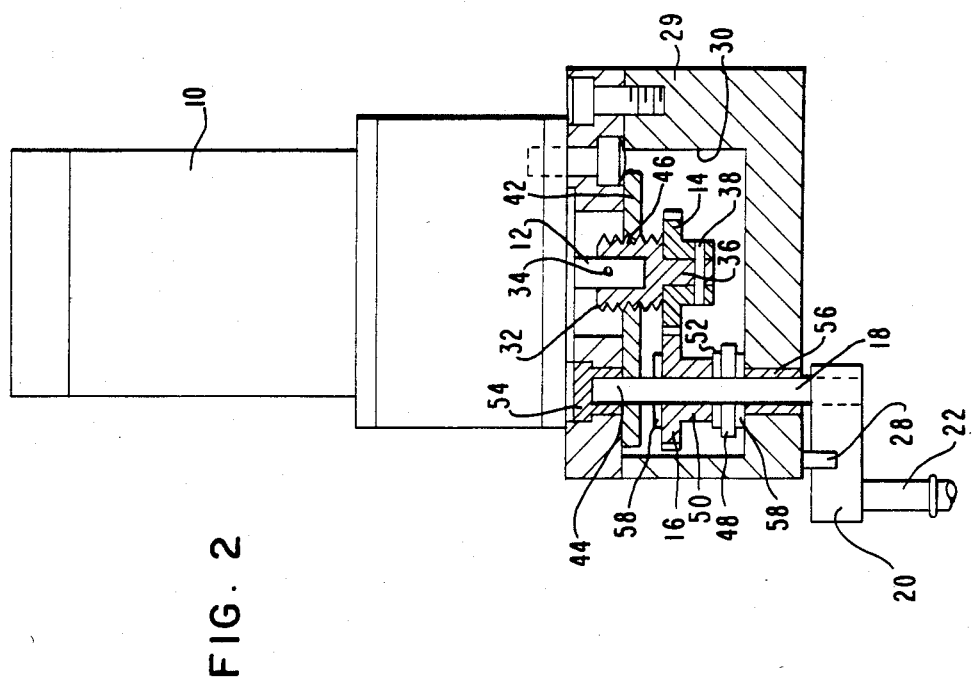

FORCE-CONTROLLED GRIPPER WITH ADAPTIVE ACCOMMODATION

BACKGROUND OF THE INVENTION

This invention pertains to the art of robotic grippers.

When a part is to be gripped and picked up by a robot gripper of conventional design, the position and location of the part should be related to the position of the gripper fingers. If the center of the part is not coincident with the center point to which the gripper fingers are closing, the part may be pushed to that closing center of the gripper fingers when the fingers are actuated. If the part is located by a fixture locating pin, and if both centers are not the same, jamming can occur. This problem exists for most castings and for parts with gripping surfaces which are dimensionally uncertain. This is why parts with an uncertain gripping profile, such as rough castings, molded parts or soft and deformable parts, are difficult to assemble automatically.

The aim of this invention is to provide a force controlled gripper in which the gripper fingers can accommodate to uncertain gripping surfaces of the part and off-center locations of the part and in which the accommodation of the gripping force enables the gripper to handle delicate parts.

SUMMARY OF THE INVENTION

In accordance with the invention, a gripper for gripping an object is provided which includes motor means having a shaft rotatable in one and an opposite direction, with the shaft carrying an output drive member, a plurality of gripper assemblies adapted to be driven by said output drive member, each gripper assembly including a rotatable shaft having a lever fixed to and projecting transversely from the shaft and having gripper finger means projecting transversely at the distal portion of the lever, coupling means between the gripper assembly shaft and the output drive member, and means for changing the torque transmitted from the output member through the coupling means to the gripper assembly shaft from a relatively low value at least until all of said gripper fingers have contacted the object, and thereafter to a relatively higher value at least adequate to permit handling the object without slipping.

BRIEF DESCRIPTION OF THE DRAWINGS

FIG. 2 is an elevation view, partly in section, illustrating a specific embodiment of a gripper for carrying out the invention, this view omitting two of three gripper assemblies for purposes of clarity;

FIG. 3 is an exploded isometric view of the main operating parts of a gripper of the type of FIG. 2;

DESCRIPTION OF THE PREFERRED EMBODIMENTS

Figure 1:
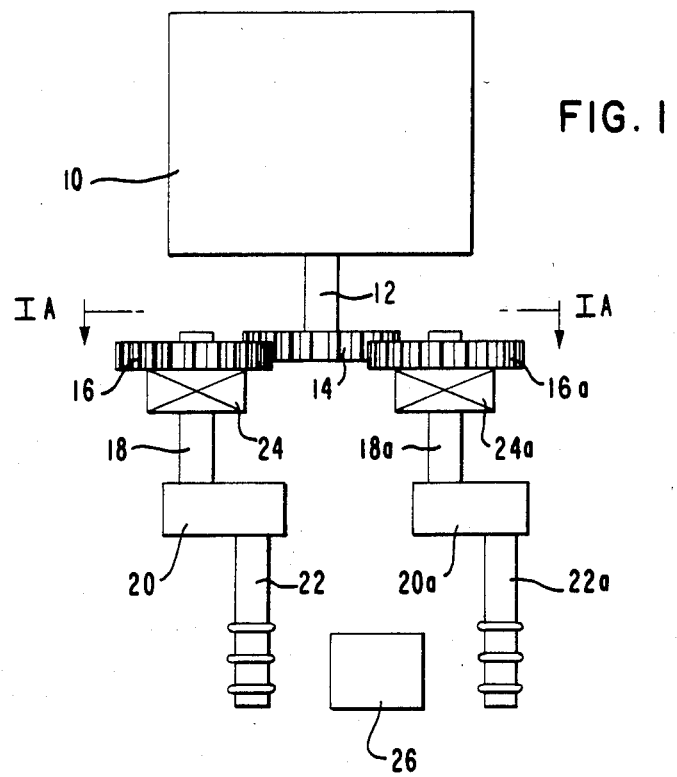
FIG. 1 is a somewhat schematic representation in the nature of an elevational view illustrating the basic concept of the invention.
Figure 1A:
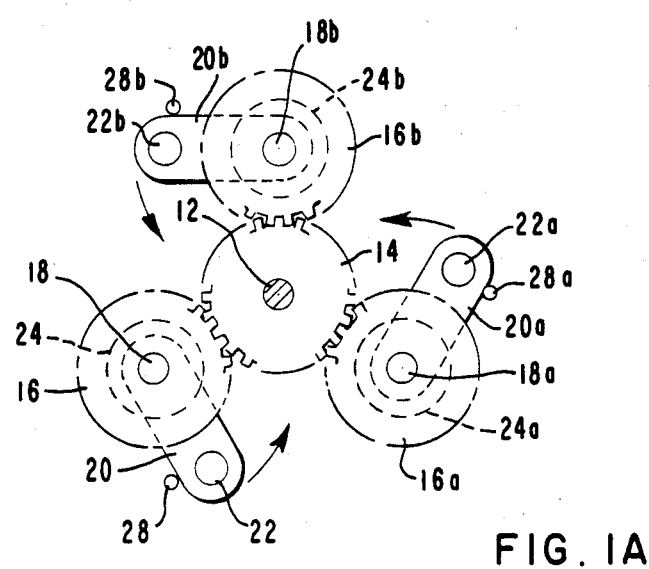
FIG. 1A is another somewhat schematic view in the nature of a plan view corresponding to one taken along the line IA—IA in FIG. 1.

Referring to FIGS. 1 and 1A, a reversible, permanent-magnet DC geared motor 10 drives shaft 12 provided with an output drive member in the form of a sun gear 14. Three planetary gears 16, 16a, and 16b are driven by the sun gear 14.

The gripper includes a plurality of gripper assemblies, each of which includes a rotatable shaft 18, 18a, and 18b with levers 20, 20a, and 20b fixed to the respective shafts and projecting transversely therefrom, with each gripper assembly including gripper finger means 22, 22a, and 22b projecting downwardly from the distal ends of the respective levers.

The power train means of the gripper which comprises the motor 10, shaft 12, output drive member 14, planetary gears 16, 16a and 16b and rotatable shafts 18, 18a and 18b includes clutch means therein schematically illustrated as at 24, 24a, and 24b for each of the respective gripper assemblies for controlling the coupling between the output drive member and the respective gripper assembly shafts.

When the motor 10 is operated in one direction, the torque transmitted through the power train will cause the fingers to be moved in toward the center to grip an object indicated at 26. The clutches function to control the torque force applied to the respective shafts of the gripper assembly to provide either a lower or higher value. The low value is selected so that very low torque is transmitted to the shafts so that as each finger contacts the object 26, the shafts of each gripper assembly slip. This slipping will continue until at least all of the gripper fingers have contacted the object. Thereafter, a relatively higher value torque is transmitted to the gripper assembly shafts, this higher value being at least adequate to permit handling the object 26 without the object slipping. The specific value of the relatively higher torque will, of course, depend upon the type and weight of objects being handled. The gripping force at the relatively higher value can be controlled by the DC geared motor through a programmable, constant current supplied to the armature of the motor which, taken with the gear ratio, generates a predetermined gripping force delivered by the fingers.

To release the part 26 after it has been manipulated, the direction of the DC motor torque is reversed and the levers carrying the fingers are rotated reversely from the direction of the arrows in FIG. 1A. The levers are driven out to the stops 28 (FIG. 1A) and any tendency for overtravel is protected by the slippage of the clutch.

Referring to FIGS. 2 and 3, one specific embodiment for carrying out the invention in one of the preferred ways is illustrated. The motor 10 and an associated gear reducer with the output shaft 12 are secured to a housing 29 having an internal cavity 30 to accommodate the various operating parts. The output shaft 12 is received in a bore of element 32 and is pinned thereto as at 34. The element 32 has a lower solid shaft portion 36 which is received in a bore of the sun gear 14 and is pinned thereto as at 38. The larger diameter part of the element 32 is provided on its exterior with helical screw threads 40.

A triangularly-shaped plate (FIG. 3), having openings 44 near each of its apexes to accommodate the upper ends of each of the shafts 18 of the gripper assemblies, is also provided with a central opening 46 provided with helical screw threads complementary to the screw threads 40 on the element 32. In assembled form, the plate 42 is received in threaded relation on the element 32.

The shaft 18 of each gripper assembly is provided with an annular flange 48. The planetary gear 16 is received on the shaft 18 in rotatable relation therewith, with the lower hub portion 50 of the gear having its lower face abutting a friction washer 52 which rests upon the annular flange 48. The shaft 18 is journalled at its upper end in a bushing 54 in the housing and below the annular flange 48 in a bushing 56. Thrust bearings 58 are provided between the annular flange 48 and the housing and also between the upper face of the planetary gear 16 and the triangular plate 42.

In operation, and assuming the plate 42 is in its upper position, as the motor is rotated in a direction to move the fingers inwardly, the pressure plate begins its descent. The sun gear 14 turns driving the planetary gear 16 which, through the coefficient of friction through the washer 52 to the annular flange 48, rotates the shaft 18 with a relatively low torque at least until the finger 22 contacts the object to be gripped. This relatively low torque value continues until the pressure plate 42 has descended to a location to press the planetary gear 16 downwardly to thereby increase the coefficient of friction between the gear and shaft and thereby obtain a relatively higher gripping torque which is at least adequate to permit handling the object without slipping. After the gripped object has been relocated, the motor 10 is reversed and the pressure plate releases and the fingers 22 are driven outwardly from the center under the relatively low torque value until stopped by the limit pins 28. The current to the motor is limited to a value which provides adequate torque for holding purposes, but permits the motor to stall at the end points of the plate without damage to the motor.

Figure 4:
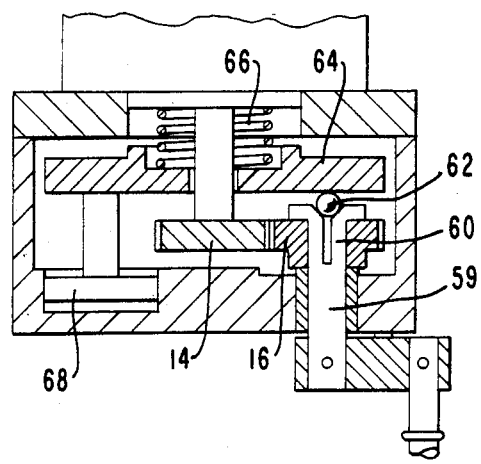
FIG. 4 is a view similar to FIG. 2 illustrating another form of gripper for carrying out the concept of the invention.
Figure 5:
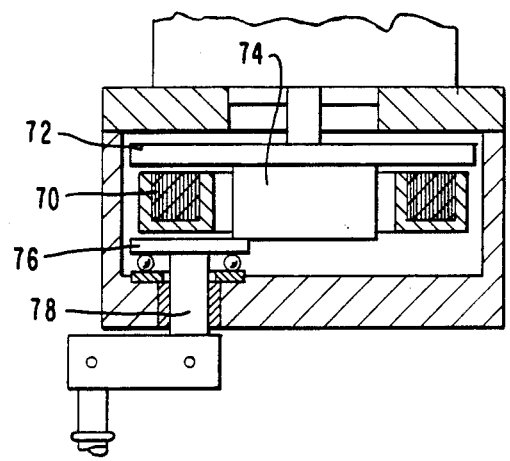
FIG. 5 illustrates still another embodiment of a gripper.
Figure 6:
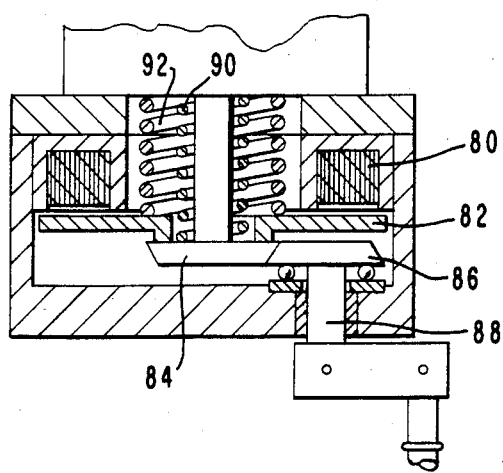
FIG. 6 illustrates still another embodiment of a gripper according to the invention.

Other embodiments of grippers having other forms for obtaining the change in coupling and clutch function in the power train are shown in FIGS. 4–6, which will only be briefly described, and will use identical numerals for those parts identical to the embodiment of FIGS. 2 and 3.

In FIG. 4, the shaft 59 of a gripper assembly has an upper split end 60 in the form of a collet with a ball 62 riding in the V-cone at the upper end of the shaft. A pressure plate 64 is biased downwardly by the compression spring 66. The downward bias of the spring is controlled by pneumatic pistons 68 (one shown) which push the pressure plate 64 up for unlocking the shaft 59 from the planetary gear 60. The amount of locking force is governed by the spring 66. When the pressure plate is pushed up by the piston, the shaft 59 will slip with respect to the planetary gear with a constant friction force governed by the spring action of the collet shaft and the coefficient of friction between the two sliding surfaces. This friction force is low enough to move the fingers to the part without moving the part. Then after the part has been contacted, the release of the pneumatic pressure permits the spring 66 to push the plate and, therefore, the ball sufficiently to expand the split shaft 60 to effectively lock the shaft to the planetary gear. Various conventional devices may be used for controlling the timing of the change in torque transmission. For example, a simple elaspsed time timer can be used. Also sensors such as a sensor on the fingers to sense contact and provide a signal can be used. Another form of sensor can be used in which the lack of continued rotation of the shaft 59 is sensed, thereby indicating contact of the finger with the object.

In the form of invention in FIG. 5, the friction force is controlled by the force of a magnetic clutch including the coil 70 and the yoke 72. By controlling the current to the coil, the yoke is pulled with a predetermined force downwardly. The yoke is integral with the motor output member in the form of a driving friction wheel 74 which drives planetary wheels 76 fixed to the upper end of the shafts 78. The axial displacement of the yoke is relatively small and is accommodated by the axial play available from the DC motor.

In operation, the coil is supplied with a relatively low current, sufficient to drive the fingers toward the center until all of the planetary wheels slip. The current is then increased to a maximum to increase the friction between the surfaces of the drive wheel and the planetary wheels. At this time, with all the fingers touching the gripped part, the fingers will exert a relatively high gripping force governed by the constant torque of the motor. The part is released, of course, by reversing the motor current and reducing the clutch coil current to the lower value.

In the embodiment of FIG. 6, an electromagnetic coil 80 is provided with an associated pressure plate 82. The drive train includes an output member in the form of a tapered friction roller 84 for driving complementary tapered friction roller 86 at the upper end of the shaft 88. A relatively light compression spring 90 biases the driving roller 84 downwardly, and a relatively heavier compression spring 92 biases the plate 82 downwardly. When the pressure plate 82 is moved upwardly by the electromagnet 80 against the force of the spring 92, the driving friction cone 84 is lightly pressed by the light spring 90 so that just enough force is exerted as to cause the fingers to rotate to contact the workpiece but slip thereafter. Upon all of the fingers contacting the workpiece, and with all the friction cones slipping, the electromagnet 80 is deenergized to release the pressure plate 82 which then exerts a higher force to the driving friction wheel and transmits the full motor torque to the fingers to grip the workpiece adequately. Release of the part is accomplished by reversing the motor and energizing the electromagnet.

In all of the embodiments, the description has been based upon the fingers grasping a part by its external surface. It will, of course, be appreciated that the device may be used in the reverse sense, that is, for gripping a part by its internal surfaces by moving the fingers outwardly. The gripper may also be used for inspection purposes by monitoring the finger positions so that a part can first be gripped and its dimensions sensed, and then transported to the desired location.

We claim:

1. A gripper device for gripping an object, comprising:
    motor means having a driving shaft rotatable in one and an opposite direction, said driving shaft carrying an output drive member;
    a plurality of gripper assemblies adapted to be driven by said output drive member, each gripper assembly including a rotatable driven shaft having a lever fixed to and projecting transversely from said driven shaft and having gripper finger means projecting transversely at the distal portion of said lever;
    coupling means between each said gripper assembly driven shaft and said output drive member; and means for changing the torque transmitted from said output drive member through said coupling means to said gripper assembly driven shafts from a relatively low value at least until all of said gripper finger means have contacted said object, and thereafter to a relatively higher value at least adequate to permit handling the object without slipping.

2. A gripper according to claim 1 wherein:

said output drive member comprises sun gear means driven by said driving shaft;

said coupling means includes planetary gear means, driven by said sun gear means, associated with each driven gripper shaft, said planetary gear means each being in partly slipping relation to its driven shaft, and a clutch means associated with each said driven shaft and its planetary gear means; and said torque changing means includes plate means movable from one position in which said low torque value is transmitted through said coupling means to another position in which said relatively higher torque value is transmitted.

3. A gripper according to claim 2 including:

means on said driving shaft providing an external helical screw;

said plate means includes a complementary helical screw opening therein so that said plate means moves on said driving shaft in accordance with direction of motor rotation for movement into and out of engagement with said planetary gear means to effect said torque value changes.

4. A gripper device for gripping an object, comprising:

power train means for transmitting power from motor means to a plurality of gripper assemblies;

said motor means driving a driving shaft rotatable in one and an opposite direction, said driving shaft carrying an output drive member;

each gripper assembly including a rotatable driven shaft having a lever fixed to and projecting transversely from said driven shaft and having gripper finger means projecting transversely at the distal portion of said lever;

clutch means in said power train means for controlling the coupling between said output drive member and said gripper assembly shafts; and means controlling said clutch means for changing the torque transmitted from said output drive member through said clutch means to said gripper assembly shafts from a relatively low value at least until all of said gripper finger means have contacted said object, and thereafter to a relatively higher value at least adequate to permit handling the object without slipping.

5. A gripper according to claim 4 wherein:

said output drive member comprises sun gear means driven by said driving shaft;

planetary gear means associated with each of said gripper assembly shafts;

said clutch means includes plate means movable from one position in which the force transmitted from said sun gear means through said planetary gear means to said gripper assembly shafts is at a relatively low value at least until all of said gripper finger means have contacted said object, to another position in which the force transmitted is at a relatively higher value at least adequate to permit handling the object without slipping.

6. A claim according to claim 5 including:

means biasing said plate means in a direction to provide the transmission of said relatively higher value of force; and means is provided to urge said plate means in a direction opposing said biasing means to obtain a force transmittal value of the relatively lower value.

7. A claim according to claim 6 wherein:

said biasing means includes spring means.

8. A claim according to claim 5 including:

electrically energized means for controlling the position of said plate means.

* * * * *